(12) United States Patent
Beifuss et al.

(10) Patent No.: US 11,582,841 B2
(45) Date of Patent: Feb. 14, 2023

(54) CORE TEMPERATURE PROBE, MICROWAVE COOKING DEVICE, AND SYSTEM

(71) Applicant: BSH Hausgeräte GmbH, Munich (DE)

(72) Inventors: Wolfgang Beifuss, Chieming (DE); Manfred Steinbacher, Inzell (DE)

(73) Assignee: BSH Hausgeräte GmbH, Munich (DE)

( * ) Notice: Subject to any disclaimer, the term of this patent is extended or adjusted under 35 U.S.C. 154(b) by 1230 days.

(21) Appl. No.: 15/752,264

(22) PCT Filed: Jul. 21, 2016

(86) PCT No.: PCT/EP2016/067349
§ 371 (c)(1),
(2) Date: Feb. 13, 2018

(87) PCT Pub. No.: WO2017/029059
PCT Pub. Date: Feb. 23, 2017

(65) Prior Publication Data
US 2019/0029083 A1 Jan. 24, 2019

(30) Foreign Application Priority Data
Aug. 19, 2015 (DE) .......................... 102015215772.5

(51) Int. Cl.
*H05B 6/68* (2006.01)
*H05B 6/64* (2006.01)
*G01K 11/26* (2006.01)

(52) U.S. Cl.
CPC ......... *H05B 6/6452* (2013.01); *G01K 11/265* (2013.01); *H05B 6/6467* (2013.01); *H05B 6/687* (2013.01); *G01K 2207/06* (2013.01)

(58) Field of Classification Search
CPC ........ G01K 11/26; G01K 11/12; G01K 11/22; G01K 11/30; G01K 11/32; G01K 11/3206;
(Continued)

(56) References Cited

U.S. PATENT DOCUMENTS 4,149,056 A * 4/1979 Kaneshiro ................ G01K 1/00
219/712
4,340,796 A * 7/1982 Yamaguchi ............ G01K 1/024
219/516
(Continued)

FOREIGN PATENT DOCUMENTS

CN 204113284 U 1/2015
DE 202010016860 U1 3/2011
(Continued)

OTHER PUBLICATIONS

National Search report CN 201680048356.X dated Mar. 26, 2020.
(Continued)

*Primary Examiner* — Charles P. Cheyney
(74) *Attorney, Agent, or Firm* — Michael E. Tschupp; Andre Pallapies; Brandon G. Braun

(57) ABSTRACT

A system includes a core temperature probe and a microwave cooking device. The core temperature probe includes a temperature sensor to determine a temperature information, a coaxial line including a lambda/4 line resonance element adjusted to a microwave frequency, and a signal transmission antenna connected to the temperature sensor via the coaxial line and adapted to emit the temperature information at a signal transmission frequency that differs from the microwave frequency. The system is hereby constructed to transmit a signal at the signal transmission frequency wirelessly between the signal transmission
(Continued)

antenna of the core temperature probe and a signal transmission antenna of the microwave cooking appliance.

8 Claims, 2 Drawing Sheets

(58) Field of Classification Search
CPC ........ G01K 1/08; G12B 17/02; H05B 6/6452; H05B 6/6467; H05B 6/687
USPC .................................................. 219/712, 713
See application file for complete search history.

(56) References Cited

U.S. PATENT DOCUMENTS

| | | | | |
|---|---|---|---|---|
| 4,377,733 | A * | 3/1983 | Yamaguchi | G01K 1/024 219/516 |
| 4,518,839 | A | 5/1985 | Taguchi et al. | |
| 6,639,505 | B2 * | 10/2003 | Murata | G01K 7/22 338/25 |
| 7,358,464 | B2 * | 4/2008 | Beier | G01K 11/265 219/497 |
| 9,427,285 | B2 * | 8/2016 | Deem | A61N 5/02 |
| 9,999,103 | B2 * | 6/2018 | Tils | G01K 1/026 |
| 2003/0228083 | A1 * | 12/2003 | Chen | G01K 11/32 385/12 |
| 2006/0218997 | A1 * | 10/2006 | Yamada | G01L 23/222 73/114.21 |
| 2008/0232428 | A1 * | 9/2008 | Ripley | G01K 1/12 374/208 |
| 2012/0188133 | A1 * | 7/2012 | Sabah | G01K 1/024 343/720 |
| 2015/0173129 | A1 | 6/2015 | Tils | |
| 2016/0377490 | A1 * | 12/2016 | Nivala | G01K 7/42 374/155 |
| 2017/0108385 | A1 * | 4/2017 | Oya | G01K 7/18 |

FOREIGN PATENT DOCUMENTS

| | | |
|---|---|---|
| DE | 102009060574 A1 | 6/2011 |
| EP | 1757862 A2 | 2/2007 |
| EP | 2163823 A1 | 3/2010 |
| EP | 2458936 A1 | 5/2012 |

OTHER PUBLICATIONS

National Search report DE 10 2015 215 772.5 dated Aug. 3, 2016.
International Search Report PCT/EP2016/067349 dated Sep. 16, 2016.

* cited by examiner

US 11,582,841 B2

CORE TEMPERATURE PROBE, MICROWAVE COOKING DEVICE, AND SYSTEM

CROSS-REFERENCES TO RELATED APPLICATIONS

This application is the U.S. National Stage of International Application No. PCT/EP2016/067349, filed Jul. 21, 2016, which designated the United States and has been published as International Publication No. WO 2017/029059 A1 and which claims the priority of German Patent Application, Serial No. 10 2015 215 772.5, filed Aug. 19, 2015, pursuant to 35 U.S.C. 119(a)-(d).

BACKGROUND OF THE INVENTION

The invention relates to a core temperature probe, having at least one temperature sensor and a signal transmission antenna that is connected to the at least one temperature sensor, wherein temperature information that is determined by the at least one temperature sensor may be emitted over the signal transmission antenna at a signal transmission frequency that differs from a microwave frequency. The invention also relates to a microwave cooking appliance having a cooking chamber that may be irradiated by microwaves of a predetermined microwave frequency, having a signal transmission antenna arranged in the cooking chamber, for the transmission of signals at a signal transmission frequency that differs from the microwave frequency, and a signal line that is guided through an oven wall. The invention further relates to a system comprising a microwave cooking appliance of this kind and at least one core temperature probe of this kind, wherein the system is intended to transmit signals at the signal transmission frequency wirelessly, between the signal transmission antenna of the core temperature probe and the signal transmission antenna of the microwave cooking appliance. The invention is applicable with particular advantage to a combination microwave and oven. The invention is also particularly advantageously applicable to a domestic appliance.

It is known that, in the case of ovens that also have a microwave function, the problem arises that microwave energy that passes through over a signal transmission antenna of a core temperature probe or the oven may interfere with the operation of constituent elements that are connected to the signal transmission antenna, such as a temperature sensor, an electrical circuit, an electronic circuit, etc., or may even destroy the constituent elements. For filtering microwave signals of this kind, the provision of a filter circuit on a printed circuit board is known, but this is unwieldy and takes up a large amount of space.

EP 1 757 862 B1 discloses an oven for cooking food, including: a cooking chamber that is accessible through an oven door; means intended to generate and emit microwaves for propagation in the cooking chamber; control means intended to process signals received from external sources and to control the microwave generating and emitting means for operation in dependence on the signals received from the external sources; a movable temperature probe that is intended to be introduced into the food in the interior of the cooking chamber of the oven and is provided with a plurality of temperature sensors that are distributed along the movable probe at predetermined intervals from one another, wherein the sensors are electrically connected to the control means in order to supply the signals of the external sources thereto, wherein the control means is intended to receive the temperature control signal coming from a predetermined one of the sensors and to modify operation of the microwave generating and emitting means once it is established that the temperature control signal has reached a predetermined value, wherein the control means is intended to receive and to compare the signals relating to the temperatures detected by the sensors, to identify the signal corresponding to the highest temperature, and to select and use it as the current temperature control signal, which is to be compared with the predetermined temperature value in order to modify the operating mode of the microwave generating and emitting means appropriately. The problem of microwaves passing undesirably through electrical circuits is not addressed.

EP 2 163 823 A1 relates to a cooking process probe for a cooking appliance for the cooking of cooking material, this cooking process probe having a tip that is at least partially insertable into the cooking material, a handle and at least one temperature sensor, wherein the output data from at least a first temperature sensor can be used to adjust at least one microwave source of the cooking appliance, and the first temperature sensor is surrounded by a material that absorbs microwaves; and further relates to a cooking appliance having a cooking process probe of this kind. However, screening the signal transmission antenna in this manner can only be implemented to a limited extent.

DE 29 35 282 A1 discloses a temperature measuring device for wirelessly monitoring the temperature of an object having a passively excitable temperature measuring probe, and a transmitter/receiver unit for externally exciting electromagnetic waves as information carriers for the respective temperature of the object. A choke arrangement for preventing microwave signals from penetrating into the inner chamber of the temperature measuring probe is disclosed. No further statements are made about the position and construction of the choke arrangement.

BRIEF SUMMARY OF THE INVENTION

The object of the present invention is to overcome, at least in part, the disadvantages of the prior art and in particular to provide a compact, robust and inexpensive way of preventing microwave signals that pass through a cooking chamber of a microwave cooking appliance over a signal transmission antenna from being able to damage constituent elements that are connected thereto.

This object is achieved according to the features of the independent claims. Preferred embodiments can be seen in particular in the dependent claims.

The object is achieved by a core temperature probe, having at least one temperature sensor and an antenna that is connected to the at least one temperature sensor (and is designated a "signal transmission antenna" below, without loss of generality), wherein temperature information that is determined by the at least one temperature sensor may be emitted over the signal transmission antenna at a predetermined frequency (designated "signal transmission frequency" below, without loss of generality) that differs from a microwave frequency, wherein the at least one temperature sensor is connected to the signal transmission antenna by way of a coaxial line, and the coaxial line has at least one lambda ($\lambda$)/4 line resonance element that is adjusted to the microwave frequency.

This gives the advantage that microwave signals that pass over the signal transmission antenna by means of the lambda/4 or $\lambda$/4 line resonance element can be at least partly reflected back to the signal transmission antenna before they reach a constituent element such as the at least one temperature sensor. In this way, the strength of the microwave signals acting on the constituent element can be markedly reduced, and the core temperature probe can be reliably protected against microwave radiation passing over the signal transmission antenna. Moreover, an arrangement of this kind may be constructed very compactly, since there is no need for large electrical or electronic constituent elements, and further the at least one lambda/4 resonance (line) element can be arranged or integrated in the coaxial line such that space is saved. Furthermore, a device of this kind may be implemented such that it is mechanically robust and heat-resistant.

Because at least one lambda/4 line resonance element adjusted to the microwave frequency is provided (wherein lambda or $\lambda$ relates to the wavelength of the microwave radiation and not that of the signal transmission frequency), there is a mismatch as a result of which step changes in impedance are produced in the coaxial line in the longitudinal direction, at the transitions between air and the material of the $\lambda/4$ line resonance element. A substantial proportion of the microwaves is reflected back at the locations of the changes in impedance.

A length of $\lambda/4$ may generally be a length of $\lambda/4+n\cdot k/2$, where n=0, 1, 2, 3, etc.

The core temperature probe may also be designated a food thermometer or meat thermometer. It may in particular have a needle-shaped section at the front, by means of which it is to be inserted into the food, and a handle at the back, adjoining the needle-shaped section. The at least one temperature sensor may be arranged in the needle-shaped section. Where there is a plurality of temperature sensors, they may be arranged in a row in the longitudinal direction of the needle-shaped section. In particular, the needle-shaped section may have a sleeve (for example made of stainless steel) that is in the shape of a hollow cylinder and ends in a closed point at the front, and has the at least one temperature sensor accommodated therein.

The core temperature probe may generally be intended to conduct at least one ("temperature") signal over the coaxial line to the signal transmission antenna for the purpose of wireless emission, wherein this temperature signal has at least one item of temperature information determined by means of the at least one temperature sensor. Both the (excitation) signal that is received over the signal transmission antenna and also the (temperature) signal that is emitted over the signal transmission antenna may be transmitted at the same signal transmission frequency, for example to the cooking appliance in the cooking chamber whereof the core temperature probe is located.

The signal transmission antenna may be located in the handle or project out of the handle.

However, in principle it is also possible to use an actively operable structure that has at least one power store and is autonomously able to generate at least one temperature signal.

In a further embodiment, it is thus possible for the signal transmission antenna to take the form of a combined transmitter/receiver antenna.

The signal transmission antenna advantageously takes a form such that return loss at the microwave frequency is as small as possible, that is to say that the signal transmission antenna is adapted such that it absorbs as little microwave power as possible.

In particular, the coaxial line may correspond to an antenna (supply) line between the signal transmission antenna and the structure.

The object is also achieved by a microwave cooking appliance having a cooking chamber that may be irradiated by microwaves of a predetermined microwave frequency, having: a signal transmission antenna that is arranged in the cooking chamber, for transmitting signals at a signal transmission frequency that differs from the microwave frequency; and a signal line that is guided through an oven wall, wherein the signal line is at least in certain sections a coaxial line, and the coaxial line has at least one lambda/4 resonance (line) element that is adjusted to the microwave frequency.

A microwave cooking appliance having a coaxial line of this kind that takes the form of an antenna supply line produces the same advantages as the coaxial line of the analogously formed core temperature probe. The coaxial line of the microwave cooking appliance may be developed analogously to the coaxial line of the core temperature probe.

The microwave cooking appliance may be formed analogously to the core temperature probe. In particular, the coaxial line of the microwave cooking appliance may be formed analogously to the coaxial line of the core temperature probe.

In a development, the microwave cooking appliance is a stand-alone microwave appliance. In another development, the microwave cooking appliance is a combination microwave and oven appliance, for example an oven or cooker having an integrated microwave function. The cooking appliance may also have a steam-cooking function.

The microwave cooking appliance may have a magnetron for generating the microwaves.

In a development, the microwave cooking appliance is a domestic appliance, in particular a kitchen appliance.

In an embodiment that relates both to the core temperature probe and also to the microwave cooking appliance, the coaxial line has an inner conductor that is formed from a piece of wire and an outer conductor that is formed from a metal sleeve, and at least one lambda/4 line resonance element takes the form of a hollow-cylindrical insulating body that is drawn over the wire and extends radially as far as the metal sleeve. This embodiment is particularly robust and inexpensive to implement. Moreover, the insulating body may take a particularly compact and, from a geometric point of view, a particularly simple form.

A further advantage lies in the fact that the electrical insulating body can serve as a heat bridge between the inner wire and the outer metal sleeve. This is because, in this way, heat that is absorbed from the cooking chamber by the signal transmission antenna can be diverted to the metal sleeve, which, at least in certain regions, is at the temperature of the food. Since an internal temperature of food which is to be detected by the core temperature probe does not typically exceed 130° C. but a cooking chamber temperature may attain as much as 300° C., the insulating body has the effect of considerably cooling the wire on its side remote from the signal transmission antenna. This protects the at least one temperature sensor, and where appropriate an additional electrical or electronic circuit, from overheating.

The piece of wire may for example be a copper wire. The piece of wire may be circular in cross section. The piece of wire may be prolonged to form the signal transmission antenna, such that one section of a wire may form the signal transmission antenna and another section of the wire the piece of wire of the coaxial line.

The metal sleeve is advantageously made of stainless steel, since this is strong and inexpensive.

The insulating body is made of electrically insulating material. A shape of its external surface corresponds to the narrow terminal point adjoining the metal sleeve, advantageously to an internal contour of the metal sleeve. The external surface is in particular circular in cross section but is not restricted to this shape. Microwaves that can pass over the signal transmission antenna are at least partly reflected at the end face facing the signal transmission antenna because the insulating body brings about a step change in impedance there, as a result of the transition from for example air to the material of the insulating body acting as a λ/4 line resonance (element). A proportion of the microwaves that is not reflected there but passes on through the coaxial line will undergo another change in impedance at the end face of this insulating body remote from the signal transmission antenna, and is thus at least partly reflected back to the signal transmission antenna. Radio signals, by contrast, pass through with virtually no loss.

For the purpose of a particularly robust and geometrically simple shape, the insulating body may be a compact solid body—apart from its internal leadthrough for the wire (that is to say it has no deliberately introduced cavities).

In another embodiment, which relates both to the core temperature probe and also to the microwave cooking appliance, the material of the insulating body has a dielectric constant $\varepsilon_r$ of between 6 and 15, in particular approximately 10. This is advantageous because it allows inexpensive materials to be used to obtain a material body of short length.

Moreover, an embodiment that relates both to the core temperature probe and also to the microwave cooking appliance has a thermal conductivity κ of at least 20 W/(m·K), in particular at least 25 W/(m·K). This results in a particularly effective heat transfer between the wire and the metal sleeve.

In a further embodiment that relates both to the core temperature probe and also to the microwave cooking appliance, the insulating body is a ceramic body. This produces the advantages that the insulating body can take a form that is electrically insulating to a high level (having a dielectric constant $\varepsilon_r$ of at least 6), has good thermal conductivity (having a thermal conductivity κ of at least 20 W/(m·K), has high mechanical strength and has good resistance to high temperature (up to temperatures above 750° C.).

In another, further embodiment that relates both to the core temperature probe and also to the microwave cooking appliance, the coaxial line has at least two lambda/4 line resonance elements. This series arrangement is particularly effective in reflecting back again microwave signals that pass through the signal transmission antenna and thus also through the coaxial line. In this arrangement, in particular two, three or indeed more lambda/4 line resonance elements may be provided. The number of lambda/4 line resonance elements may depend on the desired level of reflection and the achievable quality.

In another, further embodiment that relates both to the core temperature probe and also to the microwave cooking appliance, at least two adjacent lambda/4 line resonance elements have between them in the coaxial line an air line, which takes the form of a lambda/4 resonance line. This construction supports a particularly strong backward reflection of microwave signals that pass through the signal transmission antenna.

In a further embodiment that relates both to the core temperature probe and also to the microwave cooking appliance, the signal transmission frequency is in the 433 MHz ISM band, which extends from 433.05 MHz to 434.79 MHz. This ISM band allows data or information to be transmitted using widely available and inexpensive data transmission components. Moreover, it is sufficiently far away from conventional microwave frequencies at 2.455 GHz or those in the ISM band between 902 and 928 MHz, in particular those at 915 MHz, for virtually no crosstalk to occur between the two frequencies.

In an embodiment that relates in particular to the core temperature probe, the metal sleeve forming the outer conductor also covers the at least one temperature sensor. Thus, the metal sleeve may be the same metal sleeve in which the at least one temperature sensor, and where appropriate the electrical or electronic circuit, are also accommodated. This enables assembly to be particularly simple and can help to prevent gaps in the core temperature probe.

In another embodiment that relates in particular to the core temperature probe, the core temperature probe has a substrate having an in particular slot-shaped recess, wherein the inner conductor, in particular the piece of wire, is inserted into the recess. The recess may be electrically connected to a printed conductor arranged on the substrate, wherein the printed conductor has a free length of lambda/4. The printed conductor may be for example a printed copper conductor. As an alternative, the recess may be filled in particular with metal, in particular copper. The inner conductor, in particular the piece of wire, may be pressed into the recess and soldered to the printed conductor. The printed conductor is an open-ended printed conductor that likewise takes the form of a λ/4 transforming element and transforms an open circuit at the end of the line (that is to say at the transition to the substrate) into a short circuit at the contact point (in particular the soldering point). This advantageously allows a further backward reflection of microwave signals at the constituent element carrier.

In a development that is advantageous for achieving a particularly compact construction, the printed conductor is arranged on a side of the substrate that is remote from the side where the at least one temperature sensor is arranged. The at least one temperature sensor may for example be electrically connected to the inner conductor at the location of the HF short circuit on the printed conductor. With the printed conductor, the at least one temperature sensor may form a common node with the inner conductor.

Furthermore, in an embodiment that relates in particular to the core temperature probe, the substrate is a substrate for at least one surface wave temperature sensor. The substrate may in particular be made of ceramic or FR4 or a polyimide. The coaxial line may in particular correspond to an antenna (supply) line between the signal transmission antenna and the substrate. The at least one surface wave temperature sensor may be located on the substrate (for example in an SMD construction) or be connected thereto by way of at least one electrical line. The use of a surface wave temperature sensor—in particular in conjunction with a substrate made of ceramic—has the advantage that the core temperature probe has good resistance to high temperature (for example to over 200° C.) and is robust. The at least one surface wave temperature sensor may, with the substrate, be designated a surface wave temperature measuring device. The at least one surface wave temperature sensor makes it possible to make a temperature probe that can be read remotely, for example in the manner of a transponder that can be read by radio connection.

In a development, the core temperature probe additionally has at least one microwave filter, in particular a low-pass filter, that is constructed from conventional constituent elements and is arranged between the at least one lambda/4 line resonance element and the at least one temperature sensor, in particular on the substrate, which also carries the at least one temperature sensor. In this arrangement, the fact that the incoming microwave energy is so small that it no longer damages the conventional constituent elements is exploited. The microwave filter is transparent to radio waves, for example in the 433 MHz range.

The object is further achieved by a system comprising a microwave cooking appliance as described above and at least one core temperature probe as described above, wherein the system is intended to transmit signals at the signal transmission frequency wirelessly between the signal transmission antenna of the core temperature probe and the signal transmission antenna of the microwave cooking appliance.

The system may take a form analogous to the core temperature probe and/or the microwave cooking appliance, and produces the same advantages.

A possible operation of the system may be performed for example as follows:

A food to be processed in the cooking chamber of the microwave cooking appliance, for example a piece of meat, is to have its core temperature monitored such that the microwave cooking appliance can control a cooking operation on the basis of the core temperature. For example, the microwave cooking appliance can terminate the cooking operation on reaching a predetermined core temperature, or on reaching a predetermined duration above a particular core temperature. The microwave cooking appliance is for example an oven having an additional microwave functionality, such that the food can be processed, alternately or at the same time, by electrical oven heating elements such as circulating air heating, a top-heat heating element, a bottom-heat heating element, etc., and by microwaves. For the purpose of monitoring the core temperature, the core temperature probe is inserted into the food by means of its needle-shaped section, in which there are a plurality of temperature sensors arranged in a row. A handle at the back of the core temperature probe is located outside the food.

The core temperature probe may be remotely interrogated wirelessly (in particular by radio) by the microwave cooking appliance. For this purpose, the microwave cooking appliance has a signal transmission antenna that is located at least partly in the cooking chamber and by means of which an excitation radio signal (e.g. in the 433 MHz frequency band) may be emitted to the cooking chamber. The excitation radio signal may for example be emitted whenever the microwave cooking appliance needs an item of temperature information in order to operate, this information having for example the core temperature values that may be measured or detected by the temperature sensors.

The excitation radio signal is received over a signal transmission antenna of the core temperature probe, this antenna being tuned to a transmission frequency of approximately 433 MHz. The received excitation radio signal is passed over the coaxial line to a passively excitable surface wave temperature measuring device. The surface wave temperature measuring device has for example a substrate, for example made of ceramic or FR4, at the surface whereof there is at least one surface wave temperature sensor. The surface wave temperature sensors may be considered to be part of the surface wave temperature measuring device. The excitation radio signal causes the at least one surface wave temperature sensor to be passively excited such that an information signal that includes the requested core temperature values is generated and conducted to the signal transmission antenna. The information signal is emitted to the cooking chamber by the signal transmission antenna of the core temperature probe (likewise in the 433 MHz ISM frequency band) and received by the signal transmission antenna of the microwave cooking appliance. The received information signal is conducted over a coaxial line, through a cooking chamber wall and to a receiving circuit that processes the information signal for utilization by the cooking appliance.

For this purpose, the cooking appliance may have for example a stand-alone evaluation circuit that is connected for example to a central controller. As an alternative, the central controller may have the function of an evaluation circuit.

The microwave cooking appliance may in particular have a combined radio transmitter/receiver circuit for the purpose of generating the excitation radio signal and processing the information signal. This circuit may be connected for example to a central controller of the microwave cooking appliance.

Although the signal transmission antennas of the core temperature probe and the microwave cooking appliance are tuned to the 433 MHz ISM frequency band and are deliberately intended to make a poor connection in the microwave frequency range (e.g. at 2.45 GHz), because of the high output of microwaves of up to approximately 1000 W the passage of microwave signals through the signal transmission antennas may be so strong that structures connected to the signal transmission antennas may be damaged or even entirely destroyed. To make these microwave signals passing through virtually harmless, the at least one lambda/4 line resonance element that is integrated in the coaxial line is provided, and this brings about a change in impedance such that the microwave signals are at least partly reflected thereby back to the respective signal transmission antenna.

The invention may also be achieved by corresponding methods.

BRIEF DESCRIPTION OF THE DRAWINGS

The properties, features and advantages of this invention that are described above, and the manner in which they are achieved, will be more clearly understood in conjunction with the schematic description below of an exemplary embodiment, which will be explained in more detail with reference to the drawings.

DETAILED DESCRIPTION OF EXEMPLARY EMBODIMENTS OF THE PRESENT INVENTION

Figure 1:
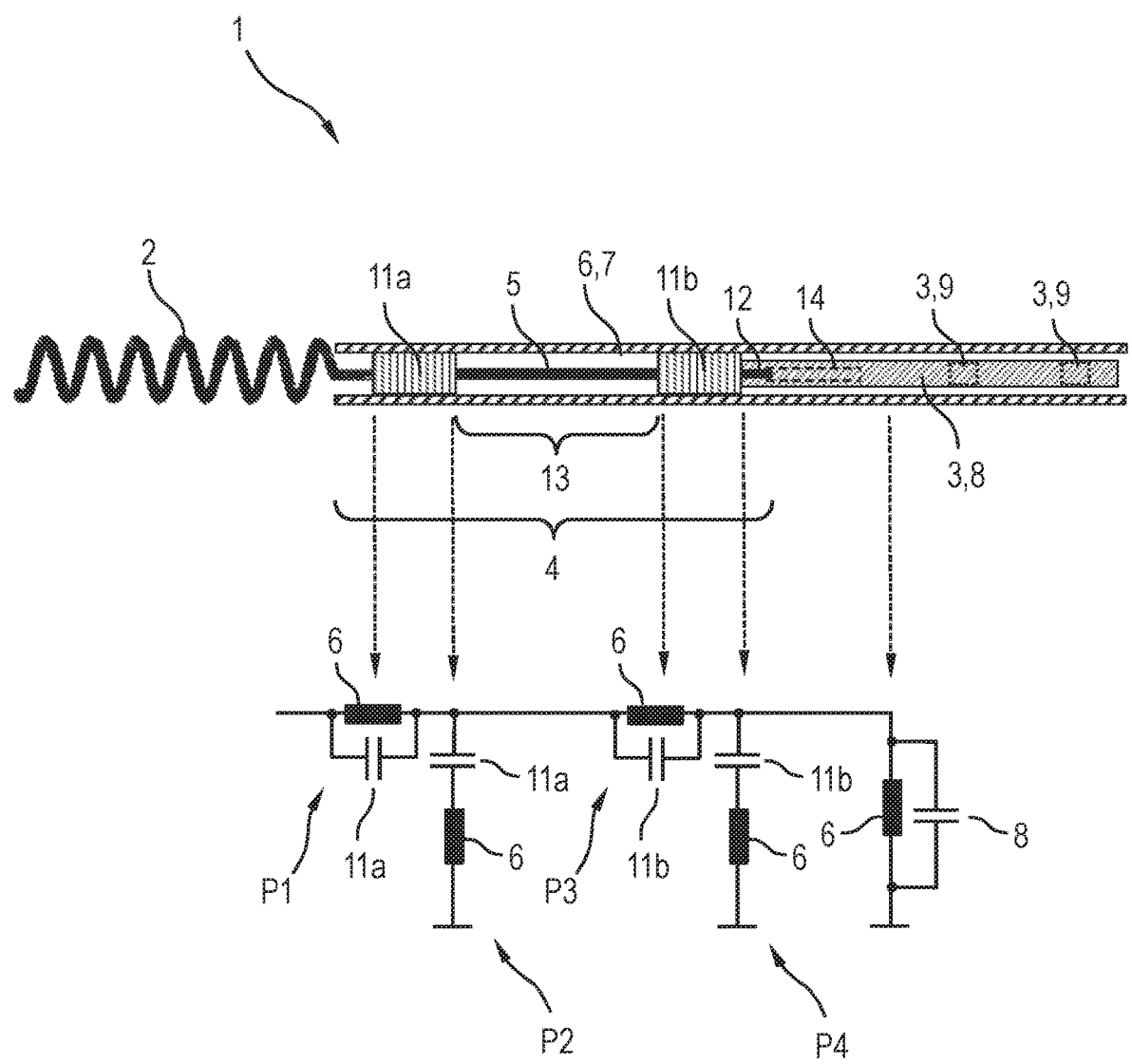
FIG. 1 shows, in a sectional illustration in plan view, a detail of a core temperature probe having a signal transmission antenna and a coaxial line, and below it a corresponding equivalent circuit diagram.

FIG. 1 shows, in a sectional illustration in side view, a detail of a core temperature probe 1 having a signal transmission antenna 2, a surface wave temperature measuring device 3 and a coaxial line 4 that connects the signal transmission antenna 2 and the surface wave temperature measuring device 3.

The signal transmission antenna 2 takes the form of a helical antenna that is made of a copper wire and merges with a rectilinear inner conductor 5, which takes the form of copper wire, of the coaxial line 4. The signal transmission antenna 2 and the inner conductor 5 may be made in one piece from a single piece of wire. The outer conductor 6 of the coaxial line 4 comprises a hollow-cylindrical stainless steel sleeve 7 that extends—as appropriate with a change in cross sectional shape—as far as over the surface wave temperature measuring device 3, or even beyond it. The surface wave temperature measuring device 3 has a ceramic or FR4 substrate 8 on the upper side whereof one or more surface wave temperature sensors 9 are arranged. In particular, the surface wave temperature sensors 9 may be soldered to the substrate 8. The surface wave temperature sensors 9 may be SMD components.

The surface wave temperature measuring device 3 may generally also have, apart from the surface wave temperature sensors 9, at least one microwave filter, in particular a low-pass filter, that is composed of conventional constituent elements (not illustrated). In this arrangement, the fact that the microwave energy arriving at the substrate 8 is so small that it no longer damages the conventional constituent elements is exploited. The conventional microwave filter may in particular be arranged between the printed conductor and the surface wave temperature sensors 9.

The end face of the inner conductor 5 is inserted into a slot-shaped recess 12 in the substrate 8. The stainless steel sleeve 7 may take a pointed form at its front end (in this case to the right of the surface wave temperature measuring device 3, and not illustrated) in order that this can be inserted into food. The stainless steel sleeve 7 also serves as a shield and prevents the surface wave temperature measuring device 3 from being able to be irradiated directly by radio waves and microwaves.

The surface wave temperature measuring device 3 may be excited by a radio excitation signal in the 433 MHz ISM band. The radio excitation signal passes over the signal transmission antenna 2 intended for this purpose, and is conducted through the coaxial line 4 to the surface wave temperature measuring device 3 with little loss, or even virtually no loss. The radio excitation signal excites the surface wave temperature sensors 9 such that they generate a modified radio signal as the temperature signal, and this is conducted back over the coaxial line 4 to the signal transmission antenna 2, which emits it. The modified radio signal contains (temperature) information that was determined by means of the at least one surface wave temperature sensor 9. The core temperature probe 1 is typically inserted into the food so deeply that the at least one surface wave temperature sensor 9 is inserted into the food and consequently measures a temperature value that corresponds sufficiently precisely to the core temperature of the food.

In order to prevent microwave signals or microwave energy passing over the signal transmission antenna 2 from being able to damage or destroy the surface wave temperature measuring device 3, the coaxial line 4 has two lambda/4 line resonance elements, in the form of hollow-cylindrical ceramic tubes 11a, 11b, that are set or adjusted to the microwave frequency (of for example 915 MHz or 2.45 GHz). The ceramic tubes 11a and 11b each have a length of one quarter of the wavelength $\lambda_{cer}$ of the microwave radiation in the ceramic material, for example about ten millimeters. The ceramic material may for example have a dielectric constant $\varepsilon_r$ of between 6 and 15 (e.g. 10) and a thermal conductivity κ of at least 20 W/(m·K) (e.g. 25 W/(m·K)). The inner conductor 5, in the form of a wire, is guided through the inner cavity of the ceramic tubes 11a and 11b such that the two ceramic tubes 11a and 11b are at a spacing of $\lambda_{air}/4$ (where $\lambda_{air}$ is the wavelength of the microwave radiation in air) from one another, e.g. approximately 30 mm. As a result, there is formed on the coaxial line 4 an air line 13 for the microwaves with a wavelength $\lambda_{air}/4$ between the two ceramic tubes 11a and 11b, which also acts as a λ/4 line resonance. The ceramic tubes 11a and 11b each completely fill the space radially between the inner conductor 5 and the outer conductor 6 and so extend as far as the outer conductor 6.

Moreover, on the underside the substrate 8 has, at the location where the inner conductor 5 is inserted, a rectilinear open-ended printed conductor 14 (indicated in dashed lines), for example a printed copper conductor. The printed conductor 14 has a length of λ/4 of the microwave, which depends on a permittivity of the substrate 8. The printed conductor 14 and the surface wave temperature sensors 9 are thus arranged on different flat sides of the substrate 8.

For the microwaves, this arrangement corresponds from a functional point of view to the equivalent circuit diagram shown underneath. The equivalent circuit corresponds to an HF circuit, wherein a "first" pole P1 is provided on the coaxial line 4 at the point where—taking as a starting point the signal transmission antenna 2—there is a first transition from air to the ceramic tube 11a (that is, at the end face of the ceramic tube 11a on the antenna side). This transition, at which a step change in impedance occurs, corresponds to an HF open circuit for the microwaves.

At the end face of the ceramic tube 11a remote from the signal transmission antenna 2, the step change in impedance at the transition from ceramic to air brings about an HF short circuit, which may also be presented as a series circuit to ground for the ceramic tube 11a acting as a capacitor and the metal sleeve 7 serving as an inductor. This series circuit may represent a further, "second" pole P2 of the HF equivalent circuit.

Analogously to the first ceramic tube 11a, there is a "third" pole P3 on the coaxial line 4 at the point where—taking as a starting point the signal transmission antenna 2—there is a first transition from air to the ceramic tube 11b (that is, at the end face of the ceramic tube 11b on the antenna side). This transition likewise corresponds to an HF open circuit for the microwaves, and in the equivalent circuit it may be presented as a parallel circuit between the ceramic tube 11b acting as a capacitor and the metal sleeve 7 serving as an inductor.

At the end face of the ceramic tube 11b remote from the signal transmission antenna 2, too, the transition from ceramic to air may bring about an HF short circuit, which may be presented as a series circuit to ground for the ceramic tube 11b acting as a capacitor and the metal sleeve 7 serving as an inductor. This series circuit may represent a "fourth" pole P4 of the HF equivalent circuit.

Consequently, each of the two ceramic tubes brings about a change in impedance for the microwave signals, and on the basis of this change in impedance the microwave signals are markedly reflected back to the signal transmission antenna 2. The form taken by the air line 13 between the two ceramic tubes 11a and 11b, as a λ/4 open-ended line, can bring about a particularly effective change in impedance.

For the purpose of further blocking or filtering the microwave signals, the printed conductor 14 takes the form of a λ/4 open-ended line whereof the substrate end is open and so transforms a short circuit at the input of the coaxial line 4.

In an equivalent description of the impedance transformations starting from the printed conductor 14, the printed conductor 14 is an open-ended line that transforms an open circuit into a short circuit at P4. The short circuit at P4 is transformed by the ceramic tube 11b into an open circuit at P3. The succeeding λ/4 line 13 converts the open circuit at P3 into a short circuit at P2 again, and the latter is transformed again by the ceramic sleeve 11a into an open circuit at P1 at the antenna 2. In this case, the microwave coming from the antenna 2 in theory sees an open circuit and is reflected in its entirety. Since the quality of the components at this high frequency is finite and so an absolute open circuit or short circuit cannot be produced, as much of the microwave output as possible at the poles P1-P4 is to be reflected back to the antenna 2.

The functioning of this microwave filtering can thus be described from both sides, that is to say from the antenna 2 or from the printed conductor 14. In both cases, changes in impedance occur in particular at joins and so the microwave signal is reflected to a large extent.

The HF open circuit comes about in particular because a relatively large change in the impedance of the coaxial line 4 produces a reflection of the advancing wave. The reflected, returning wave is overlaid on the advancing wave. Depending on the point at which the overlay on the coaxial line 4 is observed, the wave may be cancelled or amplified depending on the phase position. One case with particularly marked reflection is the λ/4 line in which, as a result of reflection at one end (corresponding to an open circuit) of the λ/4 line, complete cancellation is produced at the input of the λ/4 line, that is to say an open circuit is transformed into a short circuit. With a short circuit at a line end, the reverse is the case. The capacitances and inductances of the coaxial line 4 determine the impedance of the λ/line and hence the size of the reflection factor. In this arrangement, a parallel circuit in series with its theoretically infinite impedance is used in the case of resonance as an equivalent circuit for a transformed open circuit, and a grounded series circuit (with zero impedance) is used as a transformed short circuit for the respective frequency.

In particular for this reason too, the core temperature probe 1 shown is able to keep microwave energy away from the substrate 8, since upstream of the location at which microwave signals pass or would pass into the substrate 8—that is to say, the substrate end of the λ/4 open-ended line—there are four virtually directly adjoining λ/4 line resonance sections for the microwave frequency, namely (in the order from the substrate 8 to the helical antenna 2) the printed conductor 14, the ceramic tube 11b, the air line 13 between the two ceramic tubes 11a and 11b, and the ceramic tube 11a. In this way, it is possible to damp the microwave signals by at least 15 dB, in particular at least 18 dB, in particular at least 20 dB, in particular at least 22 dB, inexpensively and in a compact arrangement.

Figure 2:
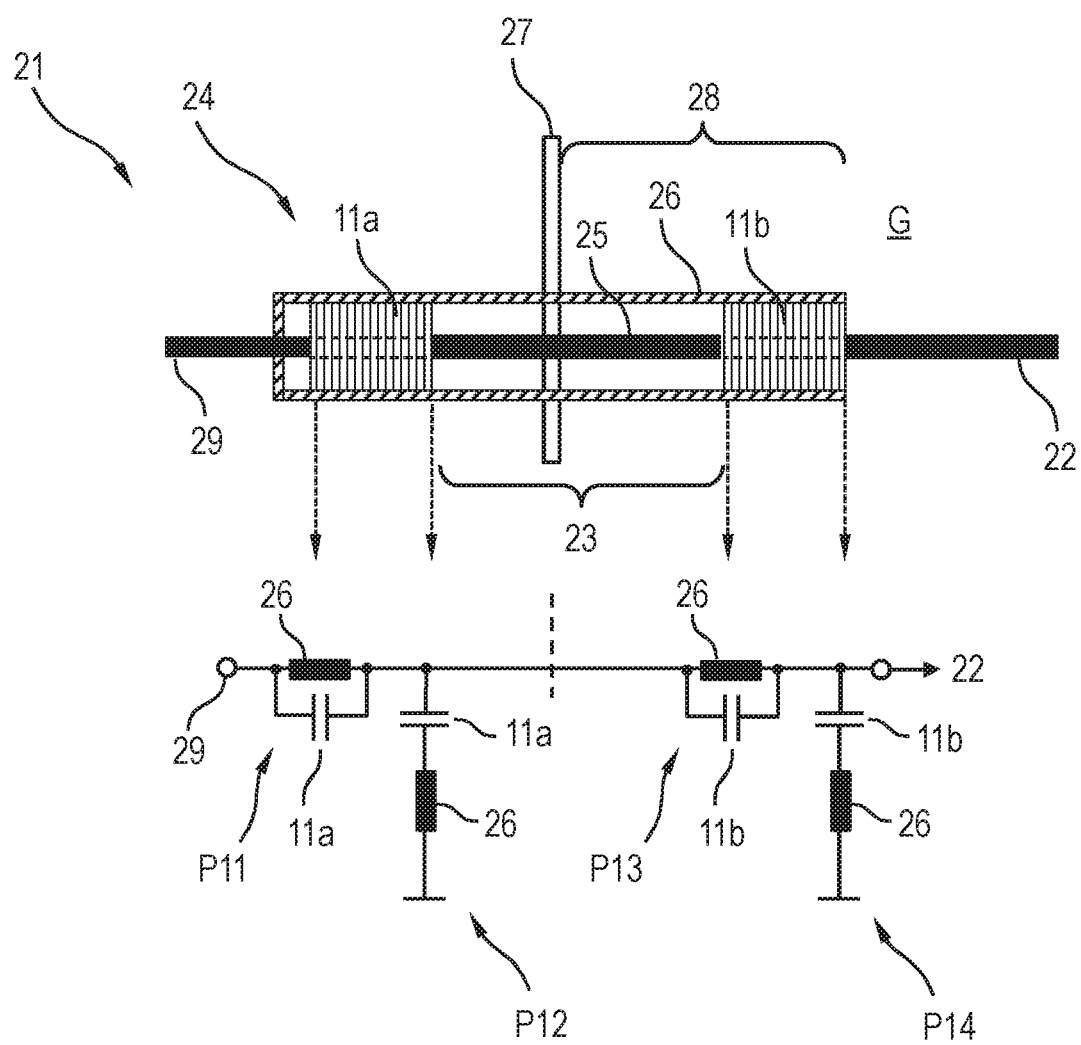
FIG. 2 shows, in a sectional illustration in plan view, a detail of a microwave cooking appliance having a signal transmission antenna and a coaxial line, and below it a corresponding equivalent circuit diagram.

FIG. 2 shows, in a sectional illustration in side view, a detail of a microwave cooking appliance 21 having a coaxial line 24, and below it a corresponding equivalent circuit diagram. The coaxial line 24 projects through a wall 27 of the microwave cooking appliance 21 and is connected, by its end located in a cooking chamber G, to a signal transmission antenna 22 in the form of a monopole antenna. The signal transmission antenna 22 and an inner conductor 25 of the coaxial line 24 may be made from a common piece of wire. The other end of the coaxial line 24, located outside the cooking chamber G and serving as a terminal 29, may be connected for example to an evaluation circuit, taking the form in particular of electronic equipment, and/or a transmitter/receiver circuit, for example by way of a 50-ohm coaxial cable.

As an alternative to a monopole antenna, another type of antenna may also be used.

The coaxial line 24 is constructed in a manner similar to the coaxial line 4. For example, it likewise has two ceramic tubes 11a and 11b that serve as λ/4 line resonance elements and are separated from one another by a λ/4 open-ended line in the form of an air gap or air line 23, that serves to provide a λ/4 line resonance. The coaxial line 24 also has a stainless steel sleeve as the outer conductor 26.

Consequently, microwaves that pass over the coaxial line 24 and into the signal transmission antenna 22 are also reflected back four times at the transitions between air and ceramic. This may be illustrated in the equivalent circuit diagram shown underneath by four poles P11 to P14 which, depending on the positions of the air/ceramic transitions for the microwaves, take the form alternately of a short circuit (poles P11 and P13) and an open circuit (poles P12 and P14). Here, the reference point is in particular the terminal of the coaxial line 24 that is remote from the cooking chamber.

In addition, the section 28 of the outer conductor 26 that is located in the cooking chamber G takes the form of a λ/4 open-ended line, which makes reflection or filtering even more effective.

The coaxial lines 4 and 24 take a form that is conductive in respect of radio signals such that there is virtually no loss. The signal transmission antennas 2 and 22 are also adapted to the radio frequency. Consequently, in a system comprising the microwave cooking appliance 21 and a core temperature probe 1 that is located in the cooking chamber G, signals may be transmitted wirelessly between the signal transmission antennas 2 and 22 at the radio frequency that serves as the signal transmission frequency, but microwaves are effectively filtered or blocked.

It goes without saying that the present invention is not restricted to the exemplary embodiment shown.

Generally speaking, the terms "a" and "one" and similar may be understood as singular or plural, in particular in the context of "at least one" or "one or more", etc., provided this is not explicitly excluded, for example by the expression "exactly one", etc.

Moreover, a numerical figure may include precisely the stated number and also a conventional tolerance range, provided this is not explicitly excluded.

The invention claimed is:

1. A core temperature probe, comprising:
a temperature sensor configured to determine a temperature information;
a coaxial line including at least two lambda/4 line resonance elements that are adjusted to a microwave frequency, the lambda/4 line resonance elements having between them in the coaxial line an air section formed as a lambda/4 resonance line; and
a signal transmission antenna connected to the temperature sensor via the coaxial line and adapted to emit the temperature information at a signal transmission frequency that differs from the microwave frequency.

2. The core temperature probe of claim 1, wherein the coaxial line includes an inner conductor formed from a piece of wire, and an outer conductor formed from a metal sleeve, said lambda/4 line resonance elements each configured as a hollow-cylindrical insulating body that is drawn over the piece of wire and extends radially as far as the metal sleeve.

3. The core temperature probe of claim 2, wherein each of the insulating bodies is made of a material which has a dielectric constant $\varepsilon_r$ of between 6 and 15 and a thermal conductivity κ of at least 20 W/(m·K).

4. The core temperature probe of claim 2, wherein each of the insulating bodies is a ceramic body.

5. The core temperature probe of claim 1, wherein the signal transmission frequency is in the 433 MHz ISM band.

6. The core temperature probe of claim 2, wherein the metal sleeve is sized to cover the temperature sensor.

7. The core temperature probe of claim 2, further comprising a substrate having a recess, and a printed conductor arranged on the substrate and having a free length of lambda/4, said piece of wire being inserted into the recess and electrically connected to the printed conductor.

8. The core temperature probe of claim 1, wherein the temperature sensor is a surface wave constituent element.

* * * * *